(12) United States Patent
Kanellopoulos et al.

(10) Patent No.: US 10,988,555 B2
(45) Date of Patent: Apr. 27, 2021

(54) METHOD FOR SEPARATING HYDROCARBONS FROM POLYMER

(71) Applicant: Borealis AG, Vienna (AT)

(72) Inventors: Vasileios Kanellopoulos, Linz (AT); Mohammad Al-Haj Ali, Helsinki (FI); Apostolos Krallis, Espoo (FI)

(73) Assignee: BOREALIS AG, Vienna (AT)

( * ) Notice: Subject to any disclaimer, the term of this patent is extended or adjusted under 35 U.S.C. 154(b) by 134 days.

(21) Appl. No.: 16/319,969

(22) PCT Filed: Sep. 18, 2017

(86) PCT No.: PCT/EP2017/073399
§ 371 (c)(1),
(2) Date: Jan. 23, 2019

(87) PCT Pub. No.: WO2018/054805
PCT Pub. Date: Mar. 29, 2018

(65) Prior Publication Data
US 2019/0270830 A1 Sep. 5, 2019

(30) Foreign Application Priority Data
Sep. 21, 2016 (EP) ..................... 16189822

(51) Int. Cl.
*C08F 6/06* (2006.01)
*C08F 6/12* (2006.01)
(Continued)

(52) U.S. Cl.
CPC ................ *C08F 6/001* (2013.01); *B01L 3/06* (2013.01); *C08F 6/003* (2013.01); *C08F 6/005* (2013.01); *C08F 30/08* (2013.01); *C08F 118/08* (2013.01); *C08F 210/02* (2013.01); *C08F 220/18* (2013.01); *B01D 2257/7022* (2013.01); *C08F 2/06* (2013.01); *C08F 6/06* (2013.01); *C08F 6/12* (2013.01); *C08F 2500/08* (2013.01)

(58) Field of Classification Search
CPC .. C08F 6/003; C08F 6/005; C08F 6/06; C08F 6/10; C08F 6/12; C08F 2/01
See application file for complete search history.

(56) References Cited

U.S. PATENT DOCUMENTS

| | | | |
|---|---|---|---|
| 4,282,348 A * | 8/1981 | Wada | B01D 3/14 528/500 |
| 10,358,507 B2 * | 7/2019 | Al-Haj Ali | C08F 6/003 |
| 2018/0371201 A1 * | 12/2018 | Al-Haj Ali | C08F 210/16 |

FOREIGN PATENT DOCUMENTS

| | | |
|---|---|---|
| CN | 1496997 A | 5/2004 |
| CN | 103 203 115 A | 7/2013 |

(Continued)

OTHER PUBLICATIONS

DE 40 29 071 A1 (Mar. 19, 1992); machine transaltion (Year: 1992).*

(Continued)

*Primary Examiner* — Rip A Lee
(74) *Attorney, Agent, or Firm* — Fay Sharpe LLP

(57) ABSTRACT

The present invention is directed to a process for separating an olefin copolymer from volatile gases using a flash separator. The flash separator can be used with a solution or high pressure process. The mass transport of volatile gases from the viscous polymer melt is increased.

20 Claims, 1 Drawing Sheet

(51) Int. Cl.
*C08F 6/00* (2006.01)
*B01L 3/06* (2006.01)
*C08F 30/08* (2006.01)
*C08F 118/08* (2006.01)
*C08F 210/02* (2006.01)
*C08F 220/18* (2006.01)
*C08F 2/06* (2006.01)

(56) References Cited

FOREIGN PATENT DOCUMENTS

| | | | |
|---|---|---|---|
| CN | 203 090 510 U | 7/2013 | |
| DE | 40 29 071 A1 * | 3/1992 | ............. B01D 1/00 |
| WO | WO 2011/087728 A2 | 7/2011 | |
| WO | WO 2015/082565 A1 | 6/2015 | |

OTHER PUBLICATIONS

International Search Report dated Dec. 1, 2017 from PCT/EP2017/073399.

* cited by examiner

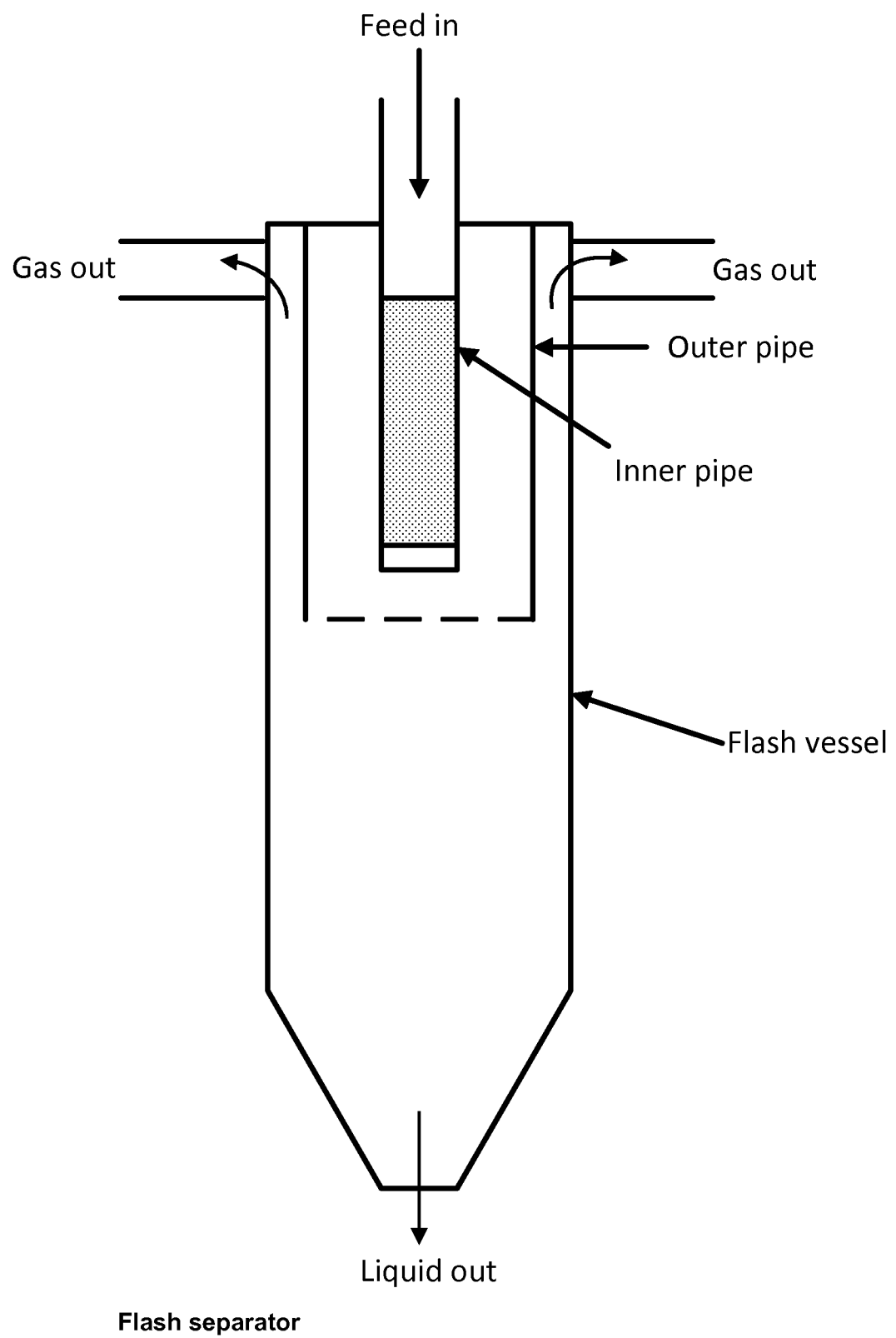
Flash separator

METHOD FOR SEPARATING HYDROCARBONS FROM POLYMER

This is a 371 of PCT Patent Application Serial No. PCT/EP2017/073399 filed Sep. 18, 2017, which claims priority to European Patent Application Serial No. 16189822.6 filed Sep. 21, 2016, the entire contents of which are incorporated herein by reference.

FIELD OF THE INVENTION

The invention is a process for a flash separator for separating an olefin copolymer from volatile gases. The flash separator can be used with a solution or high pressure process. The object is to increase the mass transfer of volatile gases from the viscous polymer melt.

BACKGROUND OF THE INVENTION

Polyolefins are produced by several different conventional technologies. Typical temperatures are from 50 to 350° C. and pressures vary from 30 to 3000 bars. The polyolefins are produced at a temperature in which the polymer is dissolved in a liquid or supercritical mixture of unreacted monomer, unreacted comonomers and optional solvents.

The polymerization process includes one or more polymerization reactors. Suitable reactors include unstirred or stirred, spherical, cylindrical and tank-like vessels and recirculating loop reactors and tubular reactors. Such reactors typically include injection points for monomer, comonomer, solvent, catalyst and optional other reactants and additives and withdrawal points for reaction mixtures. In addition the reactors may include heating or cooling means.

The separation of unreacted dissolved monomer(s), comonomer(s) and possible solvents from the reaction mixture comprising a polymer melt is commonly carried out in flash separator(s), typically carried out in one or more separation stages. In the solution process, a stream of a reaction solution withdrawn from the polymerization reactor is passed to the flash separator where ethylene with or without comonomer (i.e., propylene, 1-butene, 1-hexene, 1-octene or combination of comonomers) and hydrocarbon solvent are separated from the polymer melt.

In high pressure processes, for making LDPE, the pressure of the reaction mixture at the reactor outlet, is decreased from its operating value of about 1000 to 3000 bar to a value of 100 to 300 bar via the operation of the exit let-down valve. The reaction mixture expansion caused by the let-down valve, results in a temperature increase of the outlet reaction stream (i.e., reverse Joule-Thompson effect). Subsequently, the reaction mixture is fed into a flash separator, also called high pressure separator where the monomer/comonomer/polymer ternary mixture is split into a polymer stream, which is a polymer rich liquid phase, and a gaseous stream, which is a monomer(s)-rich gas phase. The polymer stream coming from the bottom of the flash separator is fed to a further flash separator for further removal of residual monomer(s). In the second flash separator, the pressure is further reduced. The gas stream, containing low molecular weight waxes, leaving the second flash separator (i.e., off gas) is fed to the primary compressor while the liquid bottom polymer stream is directed to the extruder for pelletization.

When operating flash separators with in viscous polymer solutions one faces a problem with respect to the achievement of the highest possible separation efficiency of the components with minimum material entrainment. The smaller the size of the polymer droplets entering the flash separator, the more enhanced is the mass transfer rate but then the risk of carry-over of the droplets increases. Entrained polymer (waxes, small size droplets, etc.) which follows the recycled gaseous stream out of the flash separator will increase fouling of down-stream heat exchangers, thus reducing the overall heat transfer rate. Moreover, deposition of entrained polymers in the pipes and compressors increases cleaning cost and maintenance time and, in extreme cases, can cause piping blockages and premature failure of mechanical components.

The object of the invention is to improve the separation of hydrocarbons from a viscous compound, such as olefin copolymer. Especially, the object of the invention is to improve the separation of hydrocarbons having a relatively high molecular weight (and which therefore are less volatile), such as the comonomer(s) used in the polymerization. It is relatively easy to separate small-size molecules as ethylene; however, the separation of bulky molecules, such as comonomers, typical examples of which are 1-octene and vinyl acrylate, from viscous olefin copolymer melt is challenging.

One object of the present invention is to increase the mass transfer of volatile gases by increasing the surface area of the droplets in the high pressure separator. Another object of this invention is a process with increased mass transfer area to efficiently separate volatile gases from the highly-viscous polymer melt.

Yet another object of the invention is to reduce the amount of droplets carry-over, i.e. the amount of entrained olefin copolymer carry-over into the gaseous stream.

The present invention is an inlet for a flash separator's having means for distribution of the reaction mixture, which is a highly viscous polymer melt. Such inlet can increase the separation efficiency with minimum risk of droplets carry over. The invention further has advantages of:

Minimum droplets entrainment combined with high separation efficiency closer to equilibrium-ideal separation
Less risk of heat exchangers, filters and compressors blockage.
Smooth operation of the flash separator.
Less effort in cleaning and maintenance of the knock out drums in the downstream processing unit.

The object of the invention is to improve separation of large molecules from the viscous compound, i.e. the reaction mixture. The removal of unreacted ethylene from ethylene homopolymer is efficient enough since ethylene has a relative high mass transport rate.

SUMMARY OF THE INVENTION

As seen from one aspect the present invention provides a flash separator comprising
  a. an inlet located at the upper part of the flash separator for feeding a reaction solution into the flash separator,
  b. optionally the inlet is circumvented with an outlet pipe,
  c. a first outlet at within the lower part of the flash separator, and
  d. a second outlet at within the upper part of the flash separator
wherein the inlet has a generally cylindrical wall characterised in that the generally cylindrical wall is perforated with multiple holes having the of size of from 15 µm to 1500 µm.

As seen from another aspect the present invention provides a process for separating hydrocarbons from a reaction solution comprising a polymer and said hydrocarbons, comprising the steps of: passing the reaction solution into the flash separator according to claim 1 thereby producing a stream of droplets falling downwards within the flash separator; withdrawing a first solution stream comprising the majority of the polymer through the first outlet; and withdrawing a second solution stream comprising mainly hydrocarbons through the second outlet thereby establishing an upwards moving gas stream within the flash separator.

Flash separators are typically operated at a pressure of at least 1 bar.

The present invention is also directed to a process of using a flash separator according to any described embodiments.

BRIEF DESCRIPTION OF THE DRAWINGS

FIG. 1 is a front-plan-view of the flash separator.

DETAILED DESCRIPTION

High Pressure Process

The olefin copolymer can be produced in a high pressure polymerization process, where an olefin, typically ethylene, is copolymerized by free-radical polymerization process. The process comprises a primary and a high-pressure compressor, a preheater and a polymerization reactor, typically an autoclave reactor (e.g. a continuous stirred tank reactor) or a tubular reactor. Comonomers and chain transfer agent are added prior the high-pressure compressor. For starting the polymerization reactions initiators are added after the preheater and along the reactor for starting and maintaining the highly exothermic polymerization reaction.

In the tubular reactor the highly exothermic polymerization reaction is carried out under supercritical conditions, e.g. between 1000 and 3500 bar, preferably between 1800 and 3400 bar, and especially preferably between 2000 and 3300 bar.

The tubular reactor comprises at least one cooling jacket. Typically the tubular reactor tubes have a length between 500 and 4000 m, preferably between 1500 and 3000 m, more preferably between 2000 and 2500 m. The operating temperature in the reactor varies between 100 and 350° C., the temperature forming a profile along the length of the reactor. In particular the temperature is between 165 and 340° C., more particularly between 165 and 320° C.

The autoclave reactor is operating above critical pressure, in particular between 500 and 3000 bar, specifically between 1000 and 2500 bar, more specifically between 1200 and 2000 bar. The operating temperature is between 100 and 340° C.

Typical comonomers are octadiene (OD), vinyl acetate (VA), meth acrylates, in particular methyl acrylate (MA), ethyl acrylate (EA), butyl acrylate (BA), methyl methacrylate (MMA), acrylic acid (AA), methacrylic acid (MAA), vinyl tri methoxy silane (VTMS), vinyl tri ethoxy silane (VTES), glycidyl methacrylate (GMA), maleic anhydride (MAH), carbon monoxide, acrylamide, gamma-metha acryloxy propyl tri methoxy silane and/or gamma-metha acryloxy propyl tri ethoxy silane.

Typical chain transfer agents are propionaldehyde (PA), propylene, propane, methyl ethyl ketone and isopropanol and/or hydrogen.

Typically the content of the olefin copolymer in the reaction mixture, comprising the polymer and the unreacted monomer and comonomer, is from 10 to 50 wt %, preferably from 10 to 40 wt %, more preferably from 10 to 35 wt %.

The stream of the reaction mixture withdrawn from the polymerization reactor, the reaction solution stream, is usually throttled to a pressure between 100 and 300 bar, preferably 220 to 270 bar and passed to the flash separator, also called high pressure separator.

Solution Polymerization

The olefin copolymer can be produced in solution polymerization process. In solution polymerization process the monomer is polymerized at a temperature in which the polymer is dissolved in the solvent mixture which is present in the process.

The process includes one or more polymerization reactors. Suitable reactors include unstirred or stirred, spherical, cylindrical and tank-like vessels and recirculating loop reactors and tubular reactors. Such reactors typically include feeding points for monomer, comonomer, solvent, catalyst and optional other reactants and additives and withdrawal points for polymer solutions. In addition the reactors may include heating or cooling means.

Typically the solution polymerization process is a high temperature solution polymerization process, using a polymerization temperature of greater than 100° C. Preferably the polymerization temperature is at least 110° C., more preferably at least 150° C. The polymerization temperature can be up to 250° C. The pressure in the solution polymerization process is preferably in a range of from 30 to 200 bar, preferably from 50 to 150 bar and more preferably from 60 to 150 bar.

The monomer is an olefin monomer. More preferably the olefin monomer is selected from the group consisting of ethylene, propylene and 1-butene, most suitable ethylene.

Typically also a comonomer is used in the polymerization. When the monomer is an olefin monomer as disclosed above, then the comonomer is different from the olefin monomer and is selected from the group consisting of linear and cyclic olefins and diolefins having from 2 to 12 carbon atoms and the mixtures thereof. Typical comonomer is an alfa-olefin, different from the monomer, and is selected from the group consisting of linear having from 2 to 12 carbon atoms and the mixtures thereof, suitably 4 to 10 carbon atoms, most suitably 1-octene.

The polymerization is typically conducted in the presence of an olefin polymerization catalyst. Such olefin polymerization catalysts comprise a transition metal compound, preferably a metal compound of group 4, such as a compound of titanium, zirconium or hafnium.

The transition metal compound may be a halide of the transition metal, such as a trihalide or a tetrahalide. Typically the transition metal halide is a titanium halide, such as titanium trichloride or titanium tetrachloride.

The transition metal compound may also be a transition metal alkyl or transition metal alkoxide compound. Such compounds are often contacted with a chlorinating compound, such as an alkyl chloride.

The transition metal compound may be combined with a group 2 metal halide, such as magnesium halide, like magnesium dichloride, and/or with a group 13 metal halide, such as aluminium or boron halide, like aluminium trichloride. Such catalysts are well known in the art and are referred to as Ziegler-Natta catalysts. A Ziegler-Natta catalyst is typically used in combination with a cocatalyst, such as an aluminium alkyl.

The transition metal compound may also be a compound comprising an organic ligand having a cyclopentadienyl structure, such as cyclopentadienyl, fluorenyl or indenyl.

Such organic ligands may also bear substituents. The transition metal may have one or two such organic ligands, which optionally are bridged, and two or three other ligands, such as alkyl, aryl or halide. Such catalysts are also well known in the art and are referred to as metallocene catalysts.

In solution polymerization process a solvent is also present. The solvent is in liquid or supercritical state in the polymerization conditions. The solvent is typically and preferably a hydrocarbon solvent. The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

Also other components may be added into the reactor. It is known to feed hydrogen into the reactor for controlling the molecular weight of the polymer formed during the polymerization. Also the use of different antifouling compounds is known in the art. In addition different kinds of activity boosters or activity retarders may be used for controlling the activity of the catalyst.

The polymer is formed in the solution polymerization process, for instance, due to the contacting of the monomer and the comonomer with the polymerization catalyst. The conditions in the reactor are such that the polymer is dissolved in the solvent. Typically the content of the olefin copolymer in the reaction mixture comprising the solvent, the olefin copolymer and the unreacted monomer and comonomer is from 10 to 50 wt %, preferably from 10 to 40 wt %, more preferably from 10 to 35 wt %.

Reaction Mixture

The stream of the reaction mixture, or the reaction solution stream, is the feed stream to the flash separator. It may be the product stream from the polymerization reactor, as discussed above. The reaction mixture stream then typically has the polymer content, composition temperature and pressure as disclosed in the section above.

The reaction mixture comprises an olefin copolymer, and at least one unreacted comonomer, suitably the olefin copolymer and gases as defined below. Suitably, the reaction mixture also comprises a solvent.

The reaction mixture stream is preferably heated prior to its entry to the flash separator. The heating may be achieved by passing the solution through one or more flash heaters, or through one or more jacketed pipes, or through a heat exchanger located upstream of the flash vessel. The reaction mixture is preheated before entering the flash separator to enhance the separation of different hydrocarbons, i.e. monomer, comonomer and the solvent. The pressure of the reaction mixture is suitably reduced before being fed to the flash separator.

In one embodiment a static mixer is placed upstream of the flash separator. The static mixer improves homogeneity of the reaction mixture Flash Separator The gases are removed from the polymer solution in one or more flash stages which are conducted in one or more flash separators. In the first flash stage, the pressure is reduced and thereby the volatile gases evaporate from the reaction mixture. It is also possible to increase the temperature of the reaction mixture upstream of the flash separator for further enhancing the evaporation of gases.

The flash separator is a vertical vessel. It preferably has a generally cylindrical shape. Thereby the flash separator has a section which has approximately a circular cross-section. Preferably the flash separator has a cylindrical section which has a shape of a circular cylinder. In addition to the cylindrical section the flash separator may have additional sections, such as a bottom section, which may be conical, and a top section which may be hemispherical. Alternatively, the flash separator may also have a generally conical shape. The volume of the flash separator is suitably at least 5 $m^3$, more suitably at least 8 $m^3$.

The temperature in the flash separator is typically from 100 to 400° C., suitably 130 to 300° C., more suitably 160 to 275° C. The temperature should be sufficiently high to keep the viscosity of the solution at a suitable level, but less than the temperature where the polymer is degraded. The pressure in the flash separator is typically from 1 to 500 bar, suitably 2 to 400 bar, most suitably 3 to 300 bar. The reaction mixture enters the flash separator through an inlet located at the upper part of the flash separator for feeding the reaction mixture wherein the inlet has holes with the of size of 15 to 1500 μm, suitably 15 to 500 μm, more suitably 20 to 300 μm. The inlet may contain baffles, plates or a static mixer. The inlet is typically separated from the flash separator by walls. The reaction mixture travels downwards into the flash separator while the gases which evaporate travel upwards. This facilitates the removal of volatile gases from the reaction mixture. The gaseous stream is typically withdrawn from the top of the flash separator (i.e. second outlet, Gas out in FIG. 1), while the polymer stream is withdrawn from the bottom (i.e. first outlet, Liquid out in FIG. 1).

In a suitable embodiment the number of holes in the inlet is 500 to 2000, suitably 750 to 1500. The holes are suitably arranged evenly over the inlet, more suitably is the inlet in a form of a cylinder with holes according to the invention evenly distributed over the surface of the cylinder. The holes are suitably circular. In another embodiment the inlet is circumvented with an outlet pipe that prevents the splashing of the droplets into the flash separator wall. The outlet pipe (i.e. outer pipe) is preferably a cylindrical shape pipe that covers the perforated one, as shown in FIG. 1, to minimize the entrainment.

According to the present invention the gases are removed from the reaction mixture in at least one flashing step. It is thus possible to remove the volatile gases in two or more flashing steps where each flashing step is conducted in a dedicated flash separator. The first flash separator receives the reaction mixture stream and removes the bulk of volatile gases. The polymer stream is withdrawn from the flash separator and can be passed to a secondary flash separator, in which a further quantity of the gases is removed. As it is well understood by the person skilled in the art, the pressure in each downstream flash separator is less than in the upstream flash separator.

In the case of multiple flash separators any one or all of the flash separators may be arranged to operate according to the present invention. The invention is however most advantageously in the first flash separator since the amount of volatile gases is the highest and the viscosity of the reaction mixture is the lowest that makes solution flow relatively easier.

When multiple flash separators are used for removing the volatile gases from the reaction mixture the polymer content in reaction mixture stream withdrawn from the first flash separator is typically from 35 to 99 wt %. The gases can be further removed in one or more downstream flash separators. In other words, the polymer stream withdrawn from the first flash separator comprise from 1 to 65 wt % of residual volatile gases.

When viewed from a different angle, the gaseous stream withdrawn from the first flash separator is from 35 to 90 wt % from the total material streams withdrawn from the flash separator, suitably 60 to 90 wt %. The gas stream typically comprises unreacted monomer, solvent, unreacted comonomer and any other gaseous components present in the reaction mixture.

By using the flash separator according to the present invention it is possible to achieve high components separation efficiency. For instance, the separation efficiency for volatile gases comprising unreacted monomer, such as ethylene, and also solvent, such as hydrocarbon solvent (as described above), and unreacted comonomer(s), such as alpha-olefins and polar comonomers, suitably octadiene (OD), vinyl acetate (VA), meth acrylates, in particular methyl acrylate (MA), ethyl acrylate (EA), butyl acrylate (BA), methyl methacrylate (MMA), acrylic acid (AA), methacrylic acid (MAA), vinyl tri methoxy silane (VTMS), vinyl tri ethoxy silane (VTES), glycidyl methacrylate (GMA), maleic anhydride (MAH), carbon monoxide, acrylamide, gamma-metha acryloxy propyl tri methoxy silane and/or gamma-metha acryloxy propyl tri ethoxy silane is at least 70 wt % and preferably at least 80 wt %. The separation efficiency is defined as the mass flow of the component withdrawn in the gaseous stream divided by the (theoretical) mass flow rate of the component in the gaseous stream in equilibrium conditions.

It is possible to have more than two flashing steps and thus more than two flash separators downstream of the reactor for removing the volatile gases. However, this increases the investment and operating costs. Therefore it is preferred to conduct the flashing in one or two steps in one or two flash separators and especially it is preferred to conduct the flashing in two steps in two flash separators.

The residual volatile gases eventually remaining in the polymer after the downstream flash separator may be removed, as it is known in the art, by suitable venting arrangements in the extruder. In such methods volatile gases material is removed from the extruder via one or more vent ports. Venting is suitably combined with stripping by using, for instance, water, nitrogen or carbon dioxide as stripping gas. Venting of volatile gases material from the extruder is well known in the industry and is discussed, for instance, in the book of Chris Rauwendaal: "Polymer Extrusion", Carl Hanser Verlag, Munich 1986, in paragraphs 8.5.2 and 8.5.3.

Also other methods known in the art for removing the residual volatile gases from the polymer may be used. Such methods may be used instead of the above-mentioned methods of secondary flash and venting in an extruder, or alternatively they can be used in combination with either one or both of them.

The invention relates to a process using the flash separator according to any previous embodiments. The pressure in the flash separator is suitably 1 bar to 500 bar, suitably 1.5 to 450 bar, more suitably 2 to 400 bar. The temperature in the high pressure separator is 100 to 400° C., suitably 130 to 300° C., more suitably 160 to 275° C.

The invention relates to the flash separator used in a process together with a solution process or a high pressure process as described above, suitably a solution process. The flash separator suitably is used for separating the olefin copolymer from unreacted monomers and at least one unreacted comonomer. The first outlet is used for a polymer stream comprising mainly the ethylene copolymer and the second outlet is used for gaseous stream comprising the recovered comonomers, more suitably the recovered monomers and comonomers, even more suitably the suitably the recovered monomers, comonomers wherein the comonomers comprise alfa-olefin as described above or an alfa-olefin as described above.

In the embodiment of the flash separator used in a process together with a solution process the inlet has holes with the size of suitably 50 to 500 μm, more suitably 80 to 350 μm. In this embodiment the pressure in the flash separator is most suitably 2 to 14 bar.

In the embodiment of the flash separator used in a process together with a high pressure process the inlet has holes with the size of suitably 15 to 100 μm, more suitably 20 to 80 μm.

In this embodiment the pressure in the flash separator is most suitably 150 to 300 bar.

According to one embodiment the reaction mixture comprises 10 to 35 wt % of olefin copolymer. Further the amount of comonomer in the reaction mixture can be above 1 wt %, suitably above 5 wt %, more suitable above 10 wt %.

In one embodiment the polymer stream in the first outlet comprises 35 to 99 wt % of olefin copolymer.

In another embodiment of the invention the olefin copolymer is an LDPE and the reaction mixture comprises ethylene and at least one polar comonomer as described above. The comonomer comprises at least one of alkylacrylate, of vinyl acetate and or vinyl silane.

In another embodiment the olefin copolymer is a plastomer, suitable an ethylene copolymer and produced in a solution process. Then the reaction mixture comprises ethylene, an alfa-olefin comonomer and a solvent.

FIG. 1 shows a flash separator. The reaction mixture is feed at the top through a cylindrical inlet with holes over the cylindrical surface. The flash separator has an outlet at the bottom for the polymer stream and gas outlet for the gaseous stream.

EXAMPLES

Example 1

The minimum droplet size required to prevent entrainment is shown in Table 1 at different gas flow rates in the case of LDPE production with a pressure of 250 bar and a temperature of 200° C. From the high pressure LDPE reactor the reaction mixture (with comonomer mass fraction around 1.5 wt % and LDPE with comonomer content of 15 wt %), with a density of 900 kg/m$^3$ and a viscosity of $3*10^{-5}$ Ns/m$^2$, is withdrawn and fed into a flash separator. The flash separator has an internal diameter of 2.0 m and height of 12.5 m.

At a gas flow rate of 30000 Kg/h the corresponding critical droplet size is found to be about 36 μm. In this case the size of the holes has to be selected so that the minimum droplet size to be above that limit. Thus, droplets produced by a screen having openings of a size of, e.g., 40 μm will not be entrained by the upwards moving gas stream. In case a dispersion screen with bigger openings is selected (i.e., 55 μm), the separator can be operated at higher gas flow rates (i.e., up to ~50000 Kg/h) since at this gas flow rate the minimum droplets size is smaller than the screen size. It should be pointed out that the bigger the dispersion screen openings (droplets size) are, the safer the is operation in terms of eliminating the risk of droplet entrainment. On the other hand, the gas separation efficiency attains lower values due to the smaller mass transfer area of the droplets.

TABLE 1

Minimum droplet size as a function of gas flow
rate in high pressure polymerization of ethylene

| Gas flow rate, Ton/hr | Minimum droplet size, μm |
|---|---|
| 10 | 18 |
| 15 | 23 |
| 20 | 28 |
| 25 | 32 |
| 30 | 36 |
| 35 | 40 |
| 40 | 44 |
| 45 | 48 |
| 50 | 52 |

Example 2

The minimum droplet size required to prevent entrainment is shown as function of gas flow rates in the case of solution process at P=6 bar and T=200° C. From the solution polymerization reactor the reaction mixture (with PE, ethylene and comonomer weight fractions of 20, 2.0 and 15.0 respectively), with a mixture density of 800 kg/m$^3$ and a viscosity=1*10$^{-5}$ Ns/m$^2$ is withdrawn and fed into a flash separator. The flash separator has an internal diameter of 2.0 m and height of 12.5 m.

At gas flow rate of 30000 Kg/h the corresponding minimum droplet size is about 150 μm. In this case the size of the openings have to be selected so that the minimum droplet size to be above that limit. Thus, droplets produced by a screen having openings size equals to e.g., 170 μm will not be entrained by the up going gases. In case that a dispersion screen with bigger openings is selected (i.e., 250 μm), the separator can be operated at higher gas flow rates (i.e., up to ~50000 Kg/h) since at this gas flow rate the critical droplets size is smaller than the screen size.

TABLE 2

Minimum droplet size as a function of gas flow
rate in solution copolymerization of ethylene

| Gas flow rate, Ton/hr | Minimum droplet size, μm |
|---|---|
| 10 | 64 |
| 15 | 86 |
| 20 | 108 |
| 25 | 129 |
| 30 | 151 |
| 35 | 173 |
| 40 | 194 |
| 45 | 218 |
| 50 | 238 |

The invention claimed is:

1. A flash separator comprising
 a. an inlet located at an upper part of the flash separator for feeding a reaction solution into the flash separator,
 b. optionally the inlet is circumvented with an outlet pipe,
 c. a first outlet within a lower part of the flash separator, and
 d. a second outlet within the upper part of the flash separator wherein the inlet has a generally cylindrical wall that is perforated with multiple holes having a size of from 15 μm to 1500 μm.

2. A process for separating hydrocarbons from a reaction solution comprising a polymer and said hydrocarbons, comprising steps of: passing the reaction solution into the flash separator according to claim 1 thereby producing a stream of droplets falling downward within the flash separator; withdrawing a first solution stream comprising a majority of the polymer through the first outlet; and withdrawing a second solution stream comprising mainly hydrocarbons through the second outlet thereby establishing an upward moving gas stream within the flash separator.

3. The process according to claim 2 wherein a size of the droplets is sufficiently large so that the droplets are not entrained by the upward moving gas stream.

4. The process according to claim 2 wherein a pressure within the flash separator is from 1 to 500 bar.

5. The process according to claim 4 wherein a temperature within the flash separator is from 100 to 400° C.

6. The process according to claim 5 comprising a step of heating the reaction solution before passing it to the flash separator.

7. The process according to claim 6 comprising a step of reducing a pressure of the reaction solution before passing it to the flash separator.

8. The process according to claim 2 wherein a temperature within the flash separator is from 100 to 400° C.

9. The process according to claim 2 comprising a step of heating the reaction solution before passing it to the flash separator.

10. The process according to claim 2 comprising a step of reducing a pressure of the reaction solution before passing it to the flash separator.

11. The process according to claim 2 wherein the polymer is an olefin copolymer.

12. The process according to claim 11 wherein the reaction solution comprises from 10 to 35 wt % of the olefin copolymer.

13. The process according to claim 12 wherein the reaction solution comprises ethylene and at least one polar comonomer.

14. The process according to claim 11 wherein an amount of comonomer in the reaction solution is at least 1 wt %.

15. The process according to claim 14 wherein the reaction solution comprises ethylene and at least one polar comonomer.

16. The process according to claim 11 wherein the olefin copolymer is a low density polyethylene.

17. The process according to claim 11 wherein the reaction solution comprises ethylene and at least one polar comonomer.

18. The process according to claim 17 wherein the polar comonomer is selected from the group consisting of alkyl-acrylates, vinyl acetates, vinyl silanes, and mixtures thereof.

19. The process according to claim 11 wherein the olefin copolymer is produced in a solution process.

20. The process according to claim 19 wherein the reaction solution comprises an alpha-olefin.

* * * * *